Figure 1:
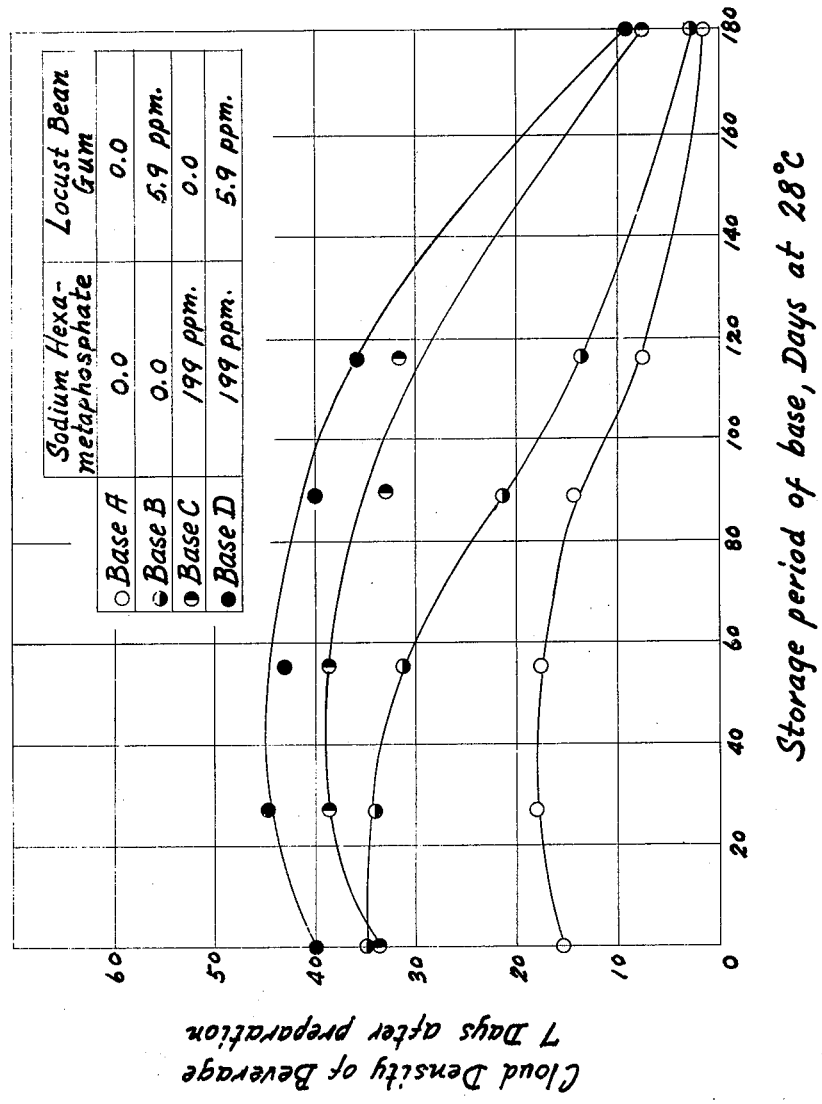

Sept. 25, 1956  J. W. STEVENS ET AL  2,764,486
CLOUD STABILIZATION OF CITRUS JUICE PRODUCTS
Filed Dec. 15, 1951  2 Sheets-Sheet 2

Jesse W. Stevens
David E. Pritchett
INVENTORS

BY
*Michael G. McDonald*
Agent

United States Patent Office 2,764,486
Patented Sept. 25, 1956

2,764,486

CLOUD STABILIZATION OF CITRUS JUICE PRODUCTS

Jesse W. Stevens, Upland, and David E. Pritchett, Ontario, Calif., assignors to Sunkist Growers, Inc., Los Angeles, Calif., a corporation of California Application December 15, 1951, Serial No. 261,884

19 Claims. (Cl. 99—78)

This invention relates to methods for maintaining or increasing the permanency of the natural cloud in beverages, and particularly in citrus fruit beverages, and to the products so obtained. The particular methods with which we are here concerned embody broadly the addition to beverages, or to beverage bases, or other beverage precursors, of certain water soluble polyphosphates, either alone or in conjunction with certain water-soluble gums having a high mannogalactan content.

The maintenance of a natural appearing cloud in citrus beverages has become a matter of paramount importance, particularly in bottled citrus beverages where a cloudy appearance is a primary factor in consumer acceptance thereof. Citrus beverages which are not turbid have an artificial appearance not consistent with the appearance of fresh citrus juices. Moreover, in any citrus beverage there will normally appear upon standing some slight sedimentation or settling of larger particles. This settling out of larger particles is normally not objectionable if the finer particles remain suspended as a cloud. However, if the fine cloud particles flocculate and also settle, then the line of demarcation between sediment and fluid becomes objectionably evident, especially if the sediment tends to solidify with age. It is hence desirable to avoid both clarification of the beverage, and the appearance of any sharply defined layer of sedimentation.

The natural "cloud" referred to above, and hereinafter, is intended to signify that natural turbidity of appearance which occurs in freshly prepared citrus juices, and which is made up of more or less pigmented, suspended particles ranging in size from colloidal to macroscopic. In characteristically naturally colored beverages such as orange juice, the color is associated primarily with these suspended particles. The suspended "cloud" particles to which we refer are distinguished from the large particles of pulp also found in fresh citrus beverages which do not remain suspended for more than a few minutes, or perhaps hours. The particles making up the actual cloud may be maintained in suspension for several days, and even weeks, by the methods hereinafter outlined which prevent flocculation of the cloud particles, thereby maintaining their settling rate as a function of their individual size instead of a larger agglomerate. By these methods the time within which non-enzymatically flocculated cloud is readily redispersible in the beverage is greatly prolonged. This is an extremely important aspect of our invention inasmuch as after a relatively short period of time such clouds are normally often not redispersible, or redispersible only when subjected to violent agitation.

In beverages prepared from aged unpasteurized bases the turbidity initially observed may be seen to spontaneously flocculate and settle to the bottom of the liquid. Frequently this may take place in the space of a few hours, depending on the age of the base, leaving an almost crystal clear supernatant fluid. After the cloud has flocculated it is almost impossible to redisperse it. This rapid, non-reversible flocculation is known to be enzymatic in nature. The practical solution to this particular type of flocculation was discovered by one of us some twenty years ago, and is disclosed in U. S. Patent No. 2,217,261 to Jesse W. Stevens, original application filed December 12, 1931. That discovery embodies a carefully controlled type of pasteurization which appears to inactivate all the enzymes, and has made the widespread production and marketing of canned and bottled citrus beverages having a relatively stable cloud a practical and continuing success. The theory presented herein is based on an assumption that the method disclosed in Patent No. 2,217,261 destroys all pectic enzymes present in the juice. This theory is correct insofar as we are aware but we recognize the possibility that the process of this patent may fail to destroy certain enzymes, the presence of which we are unable to detect, and that these may be in whole or in part responsible for what we refer to herein as non-enzymatic flocculation.

However, the elimination of enzymatically induced cloud flocculation does not in all cases, or for all types of juices, solve the total problem of cloud flocculation. It has been found that certain physical and/or chemical factors may also induce flocculation. For example, prolonged storage of enzymatically deactivated juice concentrates or beverage bases, particularly those of high acidity such as lemon concentrates, tends to induce destabilization of the cloud in the final beverage. In other cases, contamination of the beverage or concentrate with foreign metallic ions, particularly polyvalent ions, or merely changes in the method of extraction of juice from the fruit, or subsequent treatment of the beverage or some precursor thereof, may induce flocculation. In still other cases, some horticulturally arising deficiency may be a causative factor.

The problem of non-enzymatic flocculation of cloud is particularly troublesome in those compounded beverages made up from concentrated bases, which bases ordinarily contain both natural and artificial components. The natural component is usually a concentrated citrus juice, and it is this ingredient which provides the cloud in the ultimate beverage. Poor cloud stability is most generally found in compounded beverages made up from bases which have been aged for some length of time.

There is some reason to believe that enzymatic flocculation may be due to the demethoxylating or degrading action of the pectic enzymes upon the natural pectic materials which act as protective colloids in citrus juices, breaking those materials down to a stage where they may form insoluble flocculent precipitates with the polyvalent cations contained in the juice. However, the causes for non-enzymatic flocculation are not so readily explainable. Chemical demethoxylation and/or depolymerization of the pectic materials is one possibility, and may account for that type of flocculation occurring after prolonged storage at high acidities. Certain manufacturing techniques, or the introduction of foreign metallic ions, may simply disturb or disrupt the electrostatic equilibria of the whole colloidal system in some specifically unknown manner. However, in all cases a principal effect appears to be a destruction of the cloud maintaining power of the protective colloids contained in the juice.

In view of the above, two possible directions in which the problem of non-enzymatic flocculation might be solved are immediately obvious theoretically: either a protective colloid may be added which is immune to the destructive forces found in the juice or applied thereto, or some method may be sought to intercept or nullify the destructive forces themselves. In our previous copending application Serial No. 124,486, filed October 29, 1949, now Patent No. 2,599,519, we have described a procedure falling primarily in the former category, which consists in the addition to beverage bases, concentrates, or the beverages themselves, of certain water-soluble carbohydrate gums having a high content of mannogalactans. The principal commercially known members of this group are locust bean gum, guar gum and tara gum, the nature and origin of which are more fully described hereinafter, and in our copending application referred to above. Addition of these gum materials in a completely hydrated form aids materially in overcoming some of the cloud flocculating influences outlined above, and this effect is obtained, moreover, in a manner which is not fully understood. Locust bean gum for example will effectively stabilize the cloud of a class of freshly prepared concentrates which normally have poor cloud stability, even when used in proportions as low as one to ten parts per million in the beverage. Part of this effect is undoubtedly due to the protective colloid properties of the gum, but, in view of the minute quantities found to be effective, it seems probable that the gum may also have some direct counteraction upon the factors in the juice, perhaps some minor constituents, which operate to destroy its natural cloud stabilizing factors.

When any such discoveries as the above are first propounded, they are often viewed as a complete and total solution to the problems at hand. However, in practice, matters are often more complicated, and in the present case, the effectiveness of the mannogalactan gums had no sooner been established than exceptions to their complete effectiveness began to come to light. For example, it was soon found that beverages prepared from certain concentrated bases of high acidity containing relatively large amounts of locust bean gum, and which had been stored at 28° C. for about three months, exhibited very poor cloud stability. The mannogalactan gums were then found to be generally only slightly effective in overcoming cloud deficiencies brought about by aging of acidic concentrates.

Our present invention may be divided into two principal subdivisions, or related discoveries. The first of these was our completely unexpected discovery that certain inorganic materials known as calcium-sequestering agents, which, though they had been previously considered practically ineffective for sequestering calcium ions in high acidic solutions, could act as cloud stabilizers in citrus beverages, and could in fact be incorporated into highly acidic beverage bases or concentrates, and still retain their effectiveness over long periods of time. By "effectiveness" we mean the ability to maintain, or even to increase by further peptization of solid particles, the stability and density of the natural cloud.

These effective materials consist of the water soluble polyphosphate salts such as sodium hexametaphosphate, which is sold under various trade names such as "Buramin" or "Calgon." These materials presumably operate through the latter of the two approaches outlined above for obtaining cloud stability, that is, by interrupting the chain of events which leads to the destruction of the natural cloud stabilizing materials present in citrus juice. Assuming the natural stabilizing materials to be pectins, the chain of events in the case of an age-destabilized concentrate consists probably in, first, a demethoxylating and/or depolymerizing of the pectins by chemical hydrolysis to form low-methoxyl pectins or pectic acid, and secondly the formation of calcium salts of pectinic or pectic acids by combination with the natural calcium of the juice, and finally the precipitation of the calcium pectates or pectinates from solution when the critical calcium content on the pectate is reached. The low methoxyl pectins initially produced are similar to pectin in their colloidal properties and probably are not destabilizers in the absence of calcium or other precipitating cations. The polyphosphates evidently serve the purpose of tying up or sequestering such cations, thereby preventing the formation of insoluble salts of pectic materials. The partially demethoxylated pectins thus remain in solution to function as protective colloids. In addition, the polyphosphates are known to possess inherent surface active properties which may also assist in maintaining cloud stability.

The second aspect of our invention resides in the discovery that the polyphosphates referred to above may also be used to enhance the stabilzing action of the mannogalactan gums, and conversely, the gum appears to enhance the effectiveness of the polyphosphate. We have found, in cases including all the presently known types of cloud instability resulting from non-enzymatic causes, that such instability may be corrected to a commercially satisfactory degree, by adding to the beverage, or to a precursor thereof, suitable quantities of a soluble polyphosphate and a soluble mannogalactan gum. In such cases, the effects obtained excel those which may be obtained by the use of either ingredient alone, even in large quantities. Moreover, while the quantity of polyphosphate alone which is required to give effective stabilization may be excessive in some cases, these amounts may be drastically reduced when used in conjunction with the aforementioned gums.

The deleterious effects of cloud flocculation and settling may be considerably lessened if the sediment formed is readily redispersible in the beverage for an appreciable length of time by agitation. The sediment formed by non-enzymatic flocculation, tends to form a conspicuous, compact mass in the bottom of the bottle which is very unattractive and which, in time, becomes difficultly redispersible. We have found that the polyphosphates used herein prevent to a large extent the formation of this hard, compact sediment; such sedimentation as does take place remains relatively fluffy in character and may be readily redispersed upon shaking to form again a relatively stable suspension. This effect is obtained in using the polyphosphates either alone or in combination with the gums. This effect is also obtained by the use of gums alone in bases having a high pH such as orange bases but is somewhat less effective in high acid bases such as those prepared for making lemon beverages.

In view of the above, it is an object of our invention to provide a method for stabilizing, to a commercially satisfactory degree, the natural cloud of citrus beverages which are normally subject to non-enzymatic flocculation.

It is our further objective to provide a method for stabilizing those beverages which may not be satisfactorily stabilized by means of mannogalactan gums alone.

A still further object is to supplement and enhance the cloud stabilizing action of mannogalactan gums.

Another object is to facilitate the redispersion of flocculated cloud in citrus beverages, and to retard flocculation and solidifying or compacting of sediment.

A more specific object is to provide a method for stabilizing the cloud in citrus beverages by employing the most advantageous and economical methods embodying the use of water-soluble polyphosphates.

Other objects will appear from the more detailed description which follows.

The figures of the drawing represent graphically the effects obtainable by the use of sodium hexametaphosphate alone and in combination with locust bean gum, and the significance of each figure will become apparent in relation to Examples 2 and 3, hereinafter.

EXAMPLE I

An orange beverage base stabilized with sodium hexametaphosphate may be compounded from ingredients as follows:

| | | |
|---|---|---|
| Concentrated orange juice | gals | 770 |
| Citric acid, cryst | lbs | 700 |
| Sodium chloride | lbs | 30 |
| Orange oil | lbs | 14.5 |
| Sodium benzoate | lbs | 16.0 |
| Sodium hexametaphosphate | lbs | 140 |
| Water (approx.) | gals | 172 |

The concentrated orange juice contains ordinarily about 65% soluble solids, inclusive of about 6% citric acid, and should be heat treated during the course of its manufacture to inactivate enzymes, in acocrdance with U. S. Patent No. 2,217,261. The orange oil is preferably dispersed thoroughly in a portion of the concentrated juice, as by passing the mixture through a colloid mill or homogenizer, and the resulting suspension is then blended with the other ingredients. The amount of sodium hexametaphosphate specified is 1.3%, which is approximately the amount required to obtain the maximum possible cloud density under the most severe cases encountered. However, much smaller quantities are beneficial in this type of base, ranging down to as little as 0.1%. This material is preferably added in the form of a freshly prepared, concentrated water solution.

These ingredients are compounded together in known manner in a suitable container such as a stainless steel or glass lined tank provided with an agitator. The resulting beverage base may be stored for several months, and even though the concentrated juice employed may have had an inherently poor cloud stability, resulting possibly from manufacturing techniques or frost damaged fruit, the above base will be found to yield beverages having a greatly improved cloud stability and density, whether the beverage is prepared initially or after the base has been stored under refrigeration for several months.

For example, two test bases prepared as outlined in the above formula, but omitting the sodium hexametaphosphate in one, were compared for the relative cloud density imparted to beverages prepared initially and after the bases had been stored for 132 days at 28° C. In the beverage prepared initially from the unstabilized base, a cloud density reading of 123 on the Klett-Summerson photometer scale was obtained after allowing the beverage to stand for 7 days, and a similar reading from a beverage prepared after storage of the unstabilized base for 132 days showed the cloud density had dropped to 62. However, analogous readings on beverages prepared from the hexametaphosphate stabilized base showed an initial cloud density of 185, and after 132 days storage, a density of 129.

It should be understood that the Klett-Summerson colorimeter used herein to measure cloud densities, is an electronic spectrophotometric comparator having an arbitrary numerical scale designed to give comparative readings on the opacity of the samples to a given wave length band as compared to a standard blank. In measuring the cloud densities herein, we have used a red light filter throughout in order to give comparable results.

The above example illustrates a suitable commercial procedure for using sodium hexametaphosphate in citrus beverage bases as the sole stabilizer. Equivalent results may be obtained with considerably smaller amounts of hexametaphosphate if a suitable mannogalactan gum is also incorporated into the base. In order to show graphically the comparative results obtainable in using hexametaphosphate alone and in combination with locust bean gum, we cite the following example which is a complete experimental routine for comparing cloud stability of beverage bases:

EXAMPLE II

Four lemon beverage bases were compounded of ingredients as follows:

Table 1

| Base | A | B | C | D |
|---|---|---|---|---|
| Concentrated lemon juice, gms | 1,875 | 1,875 | 1,875 | 1,875 |
| Concentrated orange juice, gms | 214 | 214 | 214 | 214 |
| Sodium citrate .2H$_2$O, gms | 25.5 | 25.5 | | |
| Sodium hexametaphosphate, gms | | | 40 | 40 |
| Sodium benzoate, gms | 40.4 | 40.4 | 40.4 | 40.4 |
| Locust bean gum, gms | | 1.19 | | 1.19 |
| Water, gms | 228 | 227 | 218 | 218 |
| Percent Sodium hexametaphosphate | 0.0 | 0.0 | 1.68 | 1.68 |
| Percent Locust bean gum | 0.0 | 0.05 | 0.0 | 0.05 |
| pH | 2.34 | 2.33 | 2.24 | 2.25 |

The concentrated lemon juice used in the above compositions contained about 42.7% soluble solids, inclusive of 28.9% anhydrous citric acid. The concentrated orange juice used in the base contained about 72% soluble solids, inclusive of 9.0% anhydrous citric acid. Both concentrates had, during the course of their manufacture, been heat treated to inactivate enzymes, in accordance with U. S. Patent No. 2,217,261. The sodium citrate is added to buffer the base, and improve the flavor body. In samples C and D, the sodium hexametaphosphate, which also acts as a buffer, replaces the sodium citrate. The sodium benzoate is, of course, a preservative. The locust bean gum is preferably added in the form of a one or two percent sol, and the hexametaphosphate in the form of a freshly prepared 50% solution.

The ingredients were compounded together in known manner in suitable vessels at room temperature and with suitable agitation to give a complete admixture. The resulting bases each contained from about 40 to 45% soluble solids, inclusive of 23 to 24% anhydrous citric acid.

After compounding as outlined, the four resulting bases were deaerated under vacuum and canned in 6 oz. enamelled cans at 45° C. Samples of each base were then placed in storage at 28° C. for various periods of time as indicated in Table 2. At the end of the indicated time intervals, the respective lemon base samples were opened and made into beverage syrups by the following formula:

Lemon beverage base (from above) _____ gms__ 20
32° Baumé sugar syrup _____ ml__ 283
Lemon flavor extract _____ ml__ 0.37

Test beverages were then immediately prepared by placing a 36 ml. "throw" of the above syrups in 6½ oz. bottles, and filling the bottles with water. The sample beverages obtained were then allowed to remain at rest at room temperature for 7 days, when Klett-Summerson colorimeter readings were taken to measure the residual cloud density. The relative cloud densities of the various beverages were as shown in the following table:

Table 2

| Base | Na Hexametaphosphate in Beverage, p. p. m. | Locust Bean Gum in Beverage, p. p. m. | Storage period of base, days at 28° C. | Cloud Density of Beverage after 7 days |
|---|---|---|---|---|
| A | 0.0 | 0.0 | 0 | 16 |
| | | | 25 | 17 |
| | | | 53 | 18 |
| | | | 88 | 14 |
| | | | 116 | 8 |
| | | | 180 | 3 |
| B | 0.0 | 5.9 | 0 | 36 |
| | | | 25 | 34 |
| | | | 53 | 29 |
| | | | 88 | 17 |
| | | | 116 | 11 |
| | | | 180 | 3 |
| C | 199 | 0.0 | 0 | 34 |
| | | | 25 | 39 |
| | | | 53 | 39 |
| | | | 88 | 33 |
| | | | 116 | 32 |
| | | | 180 | 8 |
| D | 199 | 5.9 | 0 | 40 |
| | | | 25 | 36 |
| | | | 53 | 43 |
| | | | 88 | 40 |
| | | | 116 | 36 |
| | | | 180 | 9 |

The results of these procedures may be seen graphically in Figure 1 of the drawing, wherein the cloud density values reported above are plotted against the various storage periods for each of the four bases. The initial increase in cloud density shown in the case of bases C and D is believed to be due to the peptizing action of the hexametaphosphate, dispersing larger agglomerates into smaller, more readily suspendible particles, which action may go on for several days after the hexametaphosphate is added to the base. The graph shows that Base A, containing no stabilizer, exhibits a poorer cloud density at all times than the stabilized samples. Base B containing locust bean gum only, provides good initial cloud-density, but only fair cloud stability. Base C, containing hexametaphosphate alone provides good initial cloud and fairly good cloud stability. Base D, containing both stabilizers, is superior in cloud density and stability to either base B or C, containing the individual stabilizers alone.

The preceding examples show a fixed amount of stabilizers used in either case. However, manifestly, the proportions of both may be varied considerably, relatively to each other, to the beverage base, and to the final beverage. The proportion of either gum or polyphosphate which will finally reside in the beverage is usually the critical factor. We find that, when using polyphosphate alone, beneficial effects are usually obtained with as little as 20 parts per million (p. p. m.) in the beverage, while maximum effects are obtained with about 400 p. p. m. The larger quantities of polyphosphate will exert an appreciable buffer effect in the beverage, and this property may be capitalized upon by utilizing the polyphosphate to replace part of the sodium citrate buffer which is ordinarily added to beverage bases. In cases where the polyphosphate buffet effect exceeds that which is desirable, a compensating amount of citric acid may be added to attain the desired pH.

When using polyphosphate in conjunction with the mannogalactan gums, the beneficial effects of the polyphosphates begin to appear at a concentration thereof in the beverage of as little as 10 p. p. m., and the maximum stabilizing effect is reached at between 100 and 200 p. p. m., when the gum concentration is about 1 p. p. m. At slightly higher gum concentrations, around 5 to 12 p. p. m., very nearly the maximum effect of the polyphosphate may be obtained at concentrations thereof between about 50 to 100 p. p. m. When sodium hexametaphosphate and locust bean gum are used together in the beverage, we have found that particularly satisfactory results are obtained when the amount of the phosphate is from about 20 to 400 parts per million in the final beverage, and the amount of the gum is from about 1 to 30 parts per million of the final beverage. These facts, and others, are graphically shown by the following example:

EXAMPLE III

Three lemon beverage bases were compounded according to procedures generally similar to those outlined in Example 2, of ingredients as follows, wherein the parts are by weight:

| Base | E | F | G |
| --- | --- | --- | --- |
| Concentrated lemon juice | 50.4 | 50.4 | 50.4 |
| Concentrated orange juice | 5.34 | 5.34 | 5.34 |
| Sodium citrate 2H₂O | 0.64 | 0.64 | 0.64 |
| Sodium benzoate | 1.0 | 1.0 | 1.0 |
| Locust bean gum | 0.00 | 0.003 | 0.06 |
| Water | 3.7 | 2.9 | 2.9 |

The concentrated lemon juice used in the above compositions had an inherently poor cloud stability due, at least in part, to having been produced from frost damaged fruit. Both concentrates had been heat treated during the course of their manufacture to inactivate enzymes. The locust bean gum was added in the form of a 1% sol. The ingredients were all compounded together in known manner at room temperature and with suitable agitation to give a complete admixture. The resulting bases contained between 45 and 50% soluble solids, inclusive of about 23% citric acid.

After compounding as outlined, the three bases were deaerated under vacuum and canned in enamelled cans at 45–50° C. The cans were thereafter placed under refrigeration at 3° C. until required for making up beverages.

A series of beverages was then prepared from each base, by procedures similar to those outlined in Example 2, except that various quantities of a freshly prepared 2% solution of sodium hexametaphosphate were added to the beverage syrups immediately prior to the final beverage make-up. The amounts of hexametaphosphate added were calculated to yield beverages containing the amounts of hexametaphosphate specified in Table 3. The beverages were then allowed to stand for 7 days, and cloud density readings were taken on the Klett-Summerson colorimeter. The results are shown in the following table.

Table 3

| Base | Beverage No. | Stabilizer content of Beverage, p. p. m. | | Cloud Densities of Beverages after 7 days |
| --- | --- | --- | --- | --- |
| | | Locust Bean Gum | Na Hexametaphosphate | |
| E | 1 | 0 | 0 | 12 |
| | 2 | | 25 | 25 |
| | 3 | | 50 | 29 |
| | 4 | | 100 | 35 |
| | 5 | | 200 | 41 |
| | 6 | | 300 | 43 |
| | 7 | | 400 | 44 |
| | 8 | | 700 | 42 |
| F | 1 | 0.59 | 0 | 11 |
| | 2 | | 10 | 24 |
| | 3 | | 30 | 34 |
| | 4 | | 50 | 38 |
| | 5 | | 80 | 41 |
| | 6 | | 120 | 44 |
| | 7 | | 200 | 45 |
| G | 1 | 11.9 | 0 | 28 |
| | 2 | | 10 | 43 |
| | 3 | | 30 | 46 |
| | 4 | | 50 | 51 |
| | 5 | | 80 | 52 |
| | 6 | | 120 | 54 |
| | 7 | | 200 | 56 |

Figure 2:
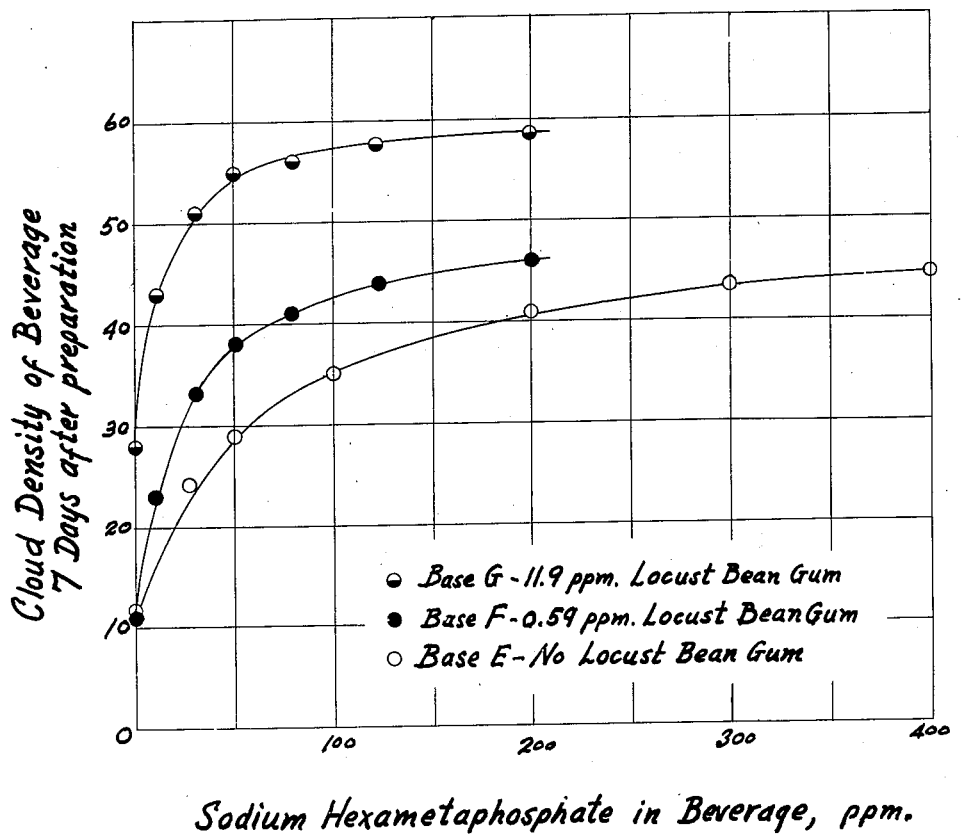

The results of these procedures may be seen graphically in Figure 2, wherein the cloud density values reported above are plotted against the hexametaphosphate content of the beverage. It will thus be seen that the effectiveness of any quantity of hexametaphosphate is enhanced in proportion to the amount of locust bean gum added.

GENERAL DISCUSSION

A. *Types of juice products which may be stabilized.*—We have found in general that the cloud stabilizing methods disclosed herein are applicable and beneficial to nearly all types of citrus beverages which have been enzymatically deactivated. We use the term citrus "beverages" herein to include any potable beverage composed either in whole or in part of juice from the orange, lemon, grapefruit or other citrus fruit whether it may consist of canned or fresh natural juices, or beverages compounded from juice bases or concentrates, even though such compounded beverage may contain only a small natural juice equivalent. In addition to those citrus juice beverages wherein the enzymes have been inactivated by heat treatment, other citrus juice beverages wherein enzymatic cloud flocculation has been eliminated or minimized by other than heat treatment may also be used.

We are concerned primarily herein with beverages compounded from bases, because it is in those concentrated bases that the primary non-enzymatic cloud destabilizing factors with which we are here concerned develop upon aging. These destabilizing effects ordinarily do not become apparent until the base is made into a beverage, inasmuch as the bases are ordinarily so viscous that cloud separation is rarely observed directly therein.

When the objective is to provide a stable cloud in beverages compounded from bases, we prefer to add the hexametaphosphate and the gum, if used, directly to the base, at some point during or after the manufacture thereof. Neither the polyphosphates nor the mannogalactan gums are particularly easy to use, as will be pointed out hereinafter, and it is hence desirable that these materials be added to the base by the manufacturer thereof in order to avoid difficulties and variations which may arise if they are added by the bottler at the time the beverage is made up.

The bottled beverages ordinarily found in commerce are usually compounded by adding water, with or without carbonation, to a beverage "syrup." This syrup is in turn made up by the bottler by admixing suitable proportions of a beverage "base" with simple 32° Bé. sugar syrup. The base is ordinarily derived from a manufacturer, and consists, in the case of citrus products, of a concentrated juice of from 40 to 65° Brix, admixed with added color, flavor, acid and preservative. The final base ordinarily contains from about 35 to about 65% soluble solids, including 10 to 25% citric acid, and sufficient buffers to provide a pH of about 2.0-3.0. Obviously, the polyphosphate and the gum could be added to any of these beverage precursors at any desired stage of manufacture, but as indicated above, it is distinctly preferable to add them to the base at the time of compounding, because at that stage best facilities are available for compounding critical proportions of ingredients. This desideratum is in fact of such commercial importance as, perhaps, to be a decisive factor in determining the commercial utility of the stabilizers. Stabilizers which are not stable in the base for reasonable lengths of time could not be used in this manner, and hence would be of limited practical value.

B. *Additive materials.*—The polyphosphate stabilizers which we use herein may comprise any water soluble compound containing a polymerized phosphate radical which is capable of sequestering polyvalent cations. By this latter condition, we do not mean to imply that the sequestering of polyvalent cations is the only manner in which these materials function in our process; they also appear to exert a specific surface activity which has been recognized in other fields. (Hatch et al.: Ind. Eng. Chem. 31, p. 51.) The materials most readily available for our purposes are the alkali metal salts of the metaphosphoric acids or pyrophosphoric acid. As presently visualized, the metaphosphoric acids and their salts may be thought of as cyclic compounds containing from three to perhaps nine $HPO_3$ units. The pyrophosphates may be regarded as derived from a dimer of orthophosphoric acid. We wish to clearly bring out however that the ordinary orthophosphates have no value for our purposes and are not included within the scope of our invention.

The polyphosphates of greatest value appear to be the more highly polymerized members of the meta group. Sodium hexametaphosphate, known in commerce as "Calgon" has been found to be especially effective. A commercially available material said to be primarily sodium octametaphosphate has also been found to be very effective. The pyrophosphates, on the other hand, appear to be not quite as effective as the metaphosphates.

The fact that polyphosphates are effective for cloud stabilizing in our products while the orthophosphates are not is a surprising phenomenon. It is well known that polyphosphates revert slowly in water solution, and more rapidly in acid or alkaline solutions, to the corresponding orthophosphate. It might thus be supposed that the polyphosphates added to acidic juices, and particularly to highly acidic beverage bases, would rapidly revert to the ineffective orthophosphates. Quite unexpectedly we have found that the polyphosphates are sufficiently stable in beverages to maintain an adequate cloud for the usual shelf life of such products. Also, even more unexpectedly, we found that these materials remain effective in the bases themselves, which may contain 10 to 20% citric acid, for periods amounting to several months at normal room temperatures or below. This prolonged effectiveness of the polyphosphates may come about fortuitously as a result of the dehydrating effect of the high sugar concentration of the base which may act to inhibit the normal hydrolysis of polyphosphate to orthophosphate. Or the sugar may partially insolubilize the polyphosphate in a manner analogous to pectin gel formation by sugar dehydration of a pectin sol, and thereby inhibit its hydrolysis. However, regardless of the explanation, it is an empirical fact that the polyphosphates remain effective in the bases for considerable lengths of time, whereas the orthophosphates are virtually ineffective.

The gums which we propose to use for enhancing the effectiveness of the polyphosphates comprise a small group of naturally occurring, water soluble gums having a high content of mannogalactan.

Of the water-soluble, high mannogalactan gums, three representatives are available in some quantity. These are guar gum, locust bean gum, and tara gum. We desire to make it clear at this point that we do not herein distinguish between locust bean gum and locust kernel gum. While a distinction is sometimes drawn in the technical literature and in the trade, based upon very minor differences in quality or other characteristics probably arising from differences in the processes and the care used in their preparation, they must, for over-all practical purposes, be regarded as one and the same thing, which we designate herein by the commonly used term, "locust bean gum."

Guar gum is derived from the beans or seeds of the plant called "guar," an annual plant of the Leguminosae, apparently the species identified as *Cyamopsis tetragonoloba* (Taub.), the Standard Cyclopedia of Horticulture, L. H. Bailey, the Macmillan Company, or possibly *Cyamposis psoralioides,* Webster's New International Dictionary, second edition.

Locust bean gum is derived from seeds of the well known and extensively grown *Ceratonia Siliqua* (Linn.) and is widely produced and extensively used in industry.

Tara gum appears to be derived from *Caesalpinia spinosa.*

*Ceratonia Siliqua* and *Caesalpinia spinosa* are also members of the Leguminosae. This is a very extensive family. The derivation of the gum from its source material and its preparation for use form no part of the present invention.

It will be appreciated from what has been said above as to the sources of the three gums, guar gum, locust bean gum, and tara gum, that locust bean gum is much more widely available commercially. Also, we find that, when the quantities used are reduced to something approaching minimal amounts, locust bean gum appears to be more effective in sustaining the suspension of the cloud than either guar gum or tara gum. We have some evidence that tara gum is somewhat superior to guar gum and perhaps nearly as effective as locust bean gum. All of these are markedly superior to any of the many other substances that we have examined experimentally.

With regard to the amounts of polyphosphate and gum which should be employed, the controlling factor seems to be the proportion of these materials which will reside in the final beverage. As indicated hereinbefore, if the polyphosphate alone is used larger quantities will be required for maximum cloud stability than if one of the mannogalactan gums is also used. On the other hand, the quantity of gum required to give the maximum degree of cloud stabilization with a polyphosphate is about the same as required for maximum stability obtainable by the gum alone. In using polyphosphate alone, we employ sufficient quantities thereof to obtain the desired degree of cloud stability, whether this be the maximum obtainable or not. In using the gums with polyphosphate, we ordinarily employ the two in a ratio to each other such that the desired degree of stability may be obtained at the minimum polyphosphate content level, in order to minimize the buffer effect of the polyphosphates. The following table is illustrative of the quantities of sodium hexametaphosphate and locust bean gum which we prefer to use in different products. Similar quantities of other polyphosphates and of mannogalactan gums may be used:

Table 4

|  | polyphosphate alone | polyphosphate plus mannogalactan gum | |
|---|---|---|---|
|  | Na Hexametaphosphate | Na Hexametaphosphate | locust bean gum |
| lemon beverage, 5% juice equivalent | p. p. m. 150–300 | p. p. m. 30–100 | p. p. m. 2–10 |
| orange beverage, 10% juice equivalent | 100–400 | 30–100 | 2–15 |

The above proportions should be taken as exemplary only; obviously larger or smaller quantities of either or both ingredients may be used to meet unusual conditions. Quantities proportionate to the above may be employed in other juice products such as canned natural strength juices, or frozen juices. In order to determine the proper quantities of the stabilizers to add to beverage bases, the above proportions may be multiplied by the specified dilution ratio of the particular base employed.

Various methods of adding the gum and the polyphosphate to the juice products may be employed. If a mannogalactan gum is used, it is important to see to it that it has full opportunity to become thoroughly hydrated.

These gums are usually available as a finely divided dry powder. Having in mind the importance of seeing to it that the gum has an opportunity to become fully hydrated, we prefer to form a sol of the gum in water prior to its addition to the juice product. One very satisfactory way to do this is first to disperse the finely powdered gum in the water by dusting it lightly onto the surface of cold water while the latter is maintained in a condition of rapid agitation. After this, the water may be boiled for a time or heated to near boiling and left at that temperature for as much as two or three hours. We do not attach particular significance to these details of procedure. We simply point out that we prefer to assure the complete hydration of the gum, since by doing so, we secure a more satisfactory stabilizing action by the use of the same amount of gum or, conversely, an equally satisfactory improvement in the stability of the cloud while using a smaller proportion of gum.

Wherever, herein and in the appended claims, we refer to these gums as being in solution it is to be understood that we recognize that the gum will actually be present in sol form, since it is understood that these substances do not pass into true solution, but form only colloidal solutions or sols.

The preferred amount of gum to be used in making up the sol is to some extent a matter of choice. Locust bean gum in equivalent proportions seems to form somewhat more viscous sols than are formed by the guar gum and tara gum that we have examined. Sols containing as high as five per cent by weight of locust bean gum (equivalent to fifty thousand parts per million) are found to possess a heavy viscosity such that they would not ordinarily be used. We have found a sol containing one per cent by weight of locust bean gum to be very convenient and satisfactory for use. It should be clearly understood, however, that the quantity of gum appearing in the finished beverage is so minute that it has practically no effect on the viscosity of the beverage.

We find it convenient also to add the polyphosphate in the form of an aqueous solution. However, in this case, the solution should be freshly prepared and may preferably be fairly concentrated, say about 50% by weight. Sodium hexametaphosphate does not dissolve rapidly but will, upon standing with occasional stirring, be observed to dissolve completely. As previously mentioned such solutions tends to hydrolyze to form lower phosphates, and in order to utilize to the fullest possible extent the effects of the polymeric phosphates the solutions should be put into use as soon as may be possible after compounding.

If polyphosphates are used such as sodium hexametaphosphate it may be desirable to add to the beverage, or its base, sufficient citric acid to overcome the buffering effect of the polyphosphate in order to maintain adequate tartness in the final beverage. Sometimes, however, in compounding citrus beverage bases a certain amount of sodium citrate is added to lower the active acidity in the base, thereby prolonging its flavor and color stability, as well perhaps as the cloud stability. We have found that, at the high acid levels encountered in citrus beverage bases, one part of sodium hexametaphosphate has about the same buffer action as one-half part of sodium citrate. Accordingly, in these products, the hexametaphosphate added may replace half its weight of sodium citrate in the base formula.

Having now described our invention fully and completely, we do not wish to be limited to the precise details disclosed, which may be optional or preferable, but only to the essential inventive features as set forth in the following claims:

1. A method of prolonging the natural cloud stability of a citrus beverage base containing at least about 40% soluble solids inclusive of about 10% fruit acids which comprises incorporating therein an amount of sodium hexametaphosphate calculated to provide about 20 to 400 parts per million thereof in the final beverage.

2. A citrus beverage base containing at least about 40% soluble solids inclusive of about 10% fruit acids having its natural cloud stabilized by the presence of an amount of sodium hexametaphosphate calculated to provide about 20 to 400 parts per million thereof in the final beverage.

3. A method of prolonging the natural cloud stability of a citrus beverage base containing at least about 40% soluble solids inclusive of about 10% fruit acids which comprises incorporating therein an amount of sodium hexametaphosphate calculated to provide about 20 to 400 parts per million thereof in the final beverage, and of locust bean gum to provide about 1 to 30 parts per million in said beverage.

4. A citrus beverage base containing at least about 40% soluble solids inclusive of about 10% fruit acids having its natural cloud stabilized by the presence of an amount of sodium hexametaphosphate calculated to provide about 20 to 400 parts per million thereof in the final beverage, and of locust bean gum to provide about 1 to 30 parts per million in said beverage.

5. A method of improving the natural cloud density and stability of a citrus juice beverage which comprises incorporating therein at least 10 parts per million of sodium hexametaphosphate and from about 1 to about 15 parts per million of a gum selected from the group consisting of locust bean gum, tara gum, and guar gum.

6. A citrus juice beverage having its natural cloud stabilized by the presence of at least 10 parts per million of sodium hexametaphosphate and from about 1 to about 15 parts per million of a gum selected from the group consisting of locust bean gum, tara gum, and guar gum.

7. A method of improving the natural cloud density and stability of an acidic citrus juice beverage, which comprises incorporating into a concentrated precursor of said beverage, a water soluble polyphosphate compound in sufficient amount to provide at least 20 parts per million in the final beverage.

8. A method of prolonging the natural cloud stability of a citrus beverage base containing at least about 40% soluble solids inclusive of about 10% fruit acids, which comprises incorporating therein a water soluble polyphosphate compound in sufficient amount to provide at least 20 parts per million in the final beverage.

9. A method of improving the natural cloud density and stability of an acidic citrus juice beverage, which comprises incorporating into a concentrated precursor of said beverage sufficient sodium hexametaphosphate to provide from about 100 to about 400 parts per million in the final beverage.

10. A concentrated precursor of an acidic citrus juice beverage having its natural cloud stabilized by the presence of an amount of a water soluble polyphosphate compound selected from the class consisting of an alkali metal salt of metaphosphoric acid and an alkali metal salt of pyrophosphoric acid sufficient to provide at least 20 parts per million in the final beverage.

11. A citrus beverage base containing at least about 40% soluble solids inclusive of about 10% fruit acids having its natural cloud stabilized by the presence of an amount of a water soluble polyphosphate compound selected from the class consisting of sodium hexametaphosphate and sodium octametaphosphate sufficient to provide at least 20 parts per million thereof in the final beverage.

12. A concentrated precursor of an acidic citrus juice beverage having its natural cloud stabilized by the presence of an amount of sodium hexametaphosphate calculated to provide from about 100 to about 400 parts per million thereof in the final beverage.

13. A method of improving the natural cloud density and stability of an acidic citrus juice beverage which comprises incorporating into a concentrated precursor of said beverage a water soluble gum having a high mannogalactan content and an amount of a water soluble polyphosphate compound selected from the class consisting of an alkali metal salt of metaphosphoric acid and an alkali metal salt of pyrophosphoric acid sufficient to provide at least 10 parts per million thereof in the final beverage.

14. A method of prolonging the natural cloud stability of a citrus beverage base containing at least about 40% soluble solids inclusive of about 10% fruit acids which comprises incorporating therein a water soluble gum having a high mannogalactan content and an amount of a water soluble polyphosphate compound selected from the class consisting of sodium hexametaphosphate and sodium octametaphosphate sufficient to provide at least 10 parts per million thereof in the final beverage.

15. A method of improving the natural cloud density and stability of an acidic citrus juice beverage which comprises incorporating therein sodium hexametaphosphate in an amount sufficient to provide about 30 to about 100 parts per million thereof in the final beverage and a gum selected from the class consisting of locust bean gum, tara gum and guar gum, the amount of said gum being sufficient to provide about 2 to about 15 parts per million thereof in the final beverage.

16. A method of improving the natural cloud density and stability of an acidic citrus juice beverage which comprises incorporating into a concentrated precursor of said beverage a gum selected from the group consisting of locust bean gum, tara gum and guar gum, and an amount of sodium hexametaphosphate sufficient to provide at least 10 parts per million thereof in the final beverage.

17. A citrus beverage base containing at least about 40% soluble solids inclusive of about 10% fruit acids having its natural cloud stabilized by the presence of a water soluble gum having a high mannogalactan content and an amount of a water soluble polyphosphate compound selected from the class consisting of an alkali metal salt of metaphosphoric acid and an alkali metal salt of pyrophosphoric acid sufficient to provide at least 10 parts per million thereof in the final beverage.

18. An acidic citrus juice beverage having its natural cloud stabilized by the presence of from about 30 to 100 parts per million of sodium hexametaphosphate and from about 2 to about 15 parts per million of a gum selected from the group consisting of locust bean gum, tara gum and guar gum.

19. A citrus juice beverage having its natural cloud stabilized by a gum selected from the group consisting of locust bean gum, tara gum and guar gum, and at least 10 parts per million of a water soluble polyphosphate compound.

References Cited in the file of this patent

UNITED STATES PATENTS

| | | |
|---|---|---|
| 2,211,209 | Johnson | Aug. 13, 1940 |
| 2,216,485 | Brandt | Oct. 1, 1940 |
| 2,253,389 | Mnookin | Aug. 19, 1941 |
| 2,396,265 | Jackson | Mar. 12, 1946 |
| 2,599,519 | Stevens | June 3, 1952 |